(12) United States Patent
Cheng et al.

(10) Patent No.: US 11,630,332 B2
(45) Date of Patent: Apr. 18, 2023

(54) MAGNETIC BLUETOOTH EYEGLASSES

(71) Applicants: Hsi-Chou Cheng, Tainan (TW); Shue-Yu Huang, Taipei (TW)

(72) Inventors: Hsi-Chou Cheng, Tainan (TW); Shue-Yu Huang, Taipei (TW)

( * ) Notice: Subject to any disclaimer, the term of this patent is extended or adjusted under 35 U.S.C. 154(b) by 97 days.

(21) Appl. No.: 17/206,510

(22) Filed: Mar. 19, 2021

(65) Prior Publication Data
US 2022/0082870 A1 Mar. 17, 2022

(30) Foreign Application Priority Data
Sep. 17, 2020 (TW) .................................. 109212223

(51) Int. Cl.
*G02C 11/00* (2006.01)
*G02C 5/14* (2006.01)

(52) U.S. Cl.
CPC .............. *G02C 11/10* (2013.01); *G02C 5/143* (2013.01); *G02C 2200/02* (2013.01)

(58) Field of Classification Search
CPC ..... G02C 11/10; G02C 2200/02; G02C 5/143
See application file for complete search history.

(56) References Cited

U.S. PATENT DOCUMENTS

| | | | | |
|---|---|---|---|---|
| 3,014,994 A * | 12/1961 | Posen | ................ | G02C 11/06 351/158 |
| 7,581,833 B2 * | 9/2009 | Howell | ................ | G02C 11/10 351/158 |
| 7,735,996 B2 * | 6/2010 | van der Zwan | ....... | G02C 11/06 381/381 |
| 7,997,724 B1 * | 8/2011 | Hsu | ................ | G02C 11/04 351/158 |
| 8,430,507 B2 * | 4/2013 | Howell | ................ | G02C 11/10 351/158 |
| 8,708,483 B2 * | 4/2014 | Kokonaski | ............ | G02C 7/083 351/158 |
| 8,840,242 B2 * | 9/2014 | Martin | ................ | G02C 11/00 351/158 |

(Continued)

FOREIGN PATENT DOCUMENTS

CN  106291985 A  *  1/2017
CN  210982915 U  *  7/2020

(Continued)

*Primary Examiner* — Christopher Stanford
(74) *Attorney, Agent, or Firm* — Rosenberg, Klein & Lee

(57) ABSTRACT

Magnetic Bluetooth eyeglasses are revealed. A Bluetooth circuit module is mounted in a mounting space of a temple and provided with a built-in Bluetooth unit connected to mobile devices. The Bluetooth circuit module further includes a microphone, a speaker, a touch switch, and a power connection base. The temple is connected to a power supply device by magnetic attraction between first and second magnetic members while the power supply device is in contact with the power connection base of the Bluetooth circuit module. Thereby users are not bothered by wires while in use and the eyeglasses are more convenient to use. Moreover, the eyeglasses can still be used during charging process. Users only need to replace the power supply device with a new one already charged instead of taking off the whole eyeglasses. The eyeglasses which prevent moisture infiltration provide longer service life.

10 Claims, 11 Drawing Sheets

(56) References Cited

U.S. PATENT DOCUMENTS

| | | | |
|---|---|---|---|
| 8,979,295 B2* | 3/2015 | Waters | A42B 1/242 |
| | | | 351/158 |
| 9,910,298 B1* | 3/2018 | Sales | G02C 11/10 |
| 2008/0100792 A1* | 5/2008 | Blum | G02C 11/10 |
| | | | 351/44 |
| 2011/0170054 A1* | 7/2011 | Jackson | G02C 11/10 |
| | | | 351/158 |
| 2019/0204617 A1* | 7/2019 | Yang | H02J 7/0045 |
| 2021/0173232 A1* | 6/2021 | Wang | H04R 9/02 |

FOREIGN PATENT DOCUMENTS

| | | | | |
|---|---|---|---|---|
| CN | 112068334 | A | * | 12/2020 |
| CN | 112415769 | A | * | 2/2021 |
| CN | 212515228 | U | * | 2/2021 |
| DE | 3919489 | A1 | * | 12/1990 |
| DE | 3921987 | A1 | * | 1/1999 |
| KR | 20170099022 | A | * | 8/2017 |
| WO | WO-2021022994 | A1 | * | 2/2021 |

* cited by examiner

MAGNETIC BLUETOOTH EYEGLASSES

BACKGROUND OF THE INVENTION

Field of the Invention

The present invention relates to magnetic Bluetooth eyeglasses, especially to magnetic Bluetooth eyeglasses which is more convenient to use because that users are not bothered by the wires while in use. Moreover, the eyeglasses can still be used during the charging process. Instead of taking off the whole eyeglasses, users only need to replace the power supply device with a new one already charged.

Description of Related Art

Various types of earphones allow users to listen music conveniently without affecting other people around them. While in use, the earphones may keep falling off because users accidentally tug the cables/wires of the earphones. Thus the earphones are inconvenient to use and more and more people turn to wireless earphones for complete freedom. However, the earphones fitted securely inside the ears may irritate the ear while in use and this is not only uncomfortable but can also cause pain for users.

Thus there is room for improvement and there is a need to provide novel earphone assembly that addresses the above issues.

SUMMARY OF THE INVENTION

Therefore it is a primary object of the present invention to provide magnetic Bluetooth eyeglasses which is more convenient to use because that users are not bothered by the wires while in use. Moreover, the eyeglasses can still be used during the charging process. Instead of taking off the whole eyeglasses, users only need to replace the power supply device with a new one already charged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions together with the related figures and numbers therein.

Figure 1:
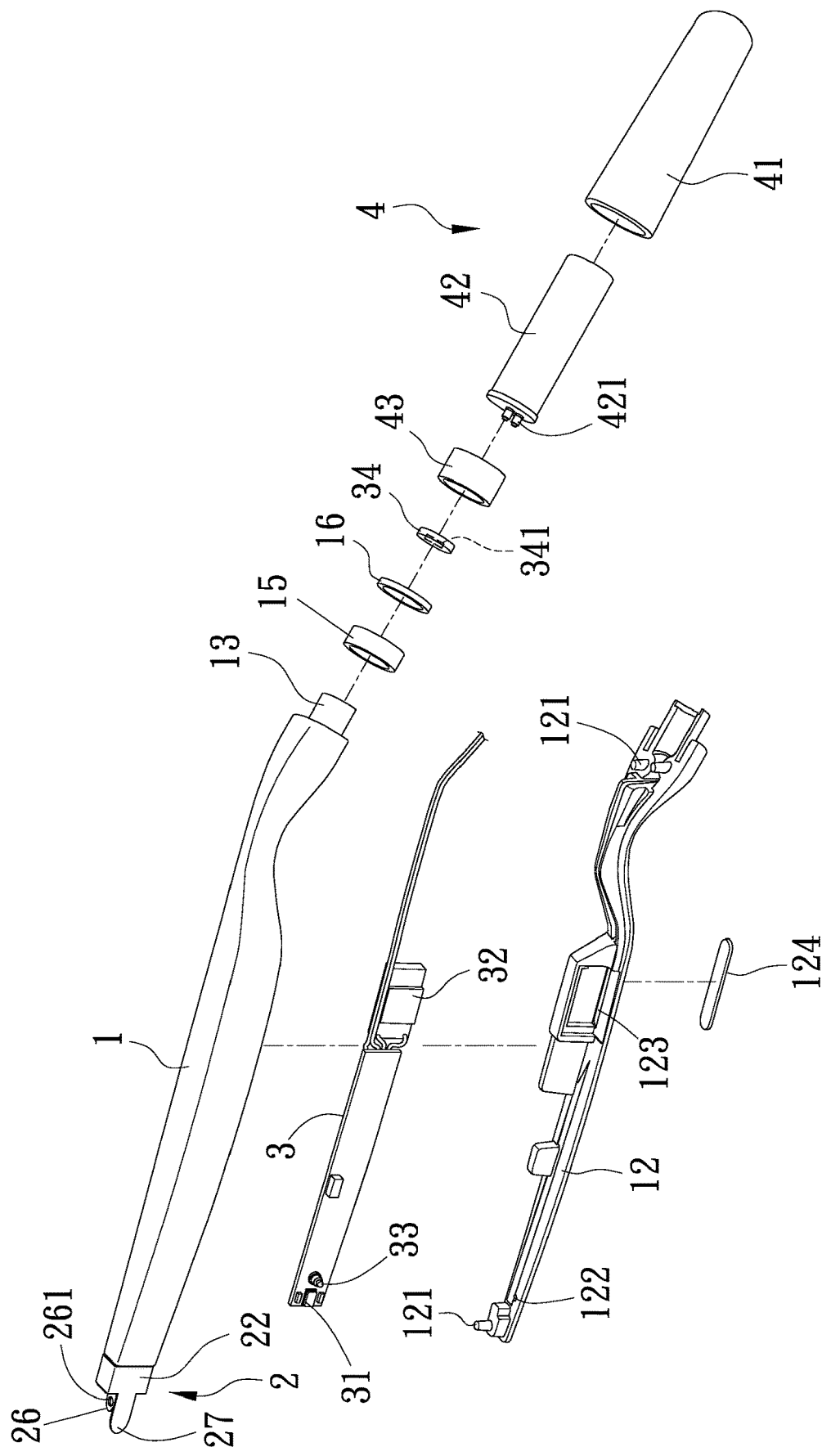
FIG. 1 is an explosive view of an embodiment according to the present invention.
Figure 2:
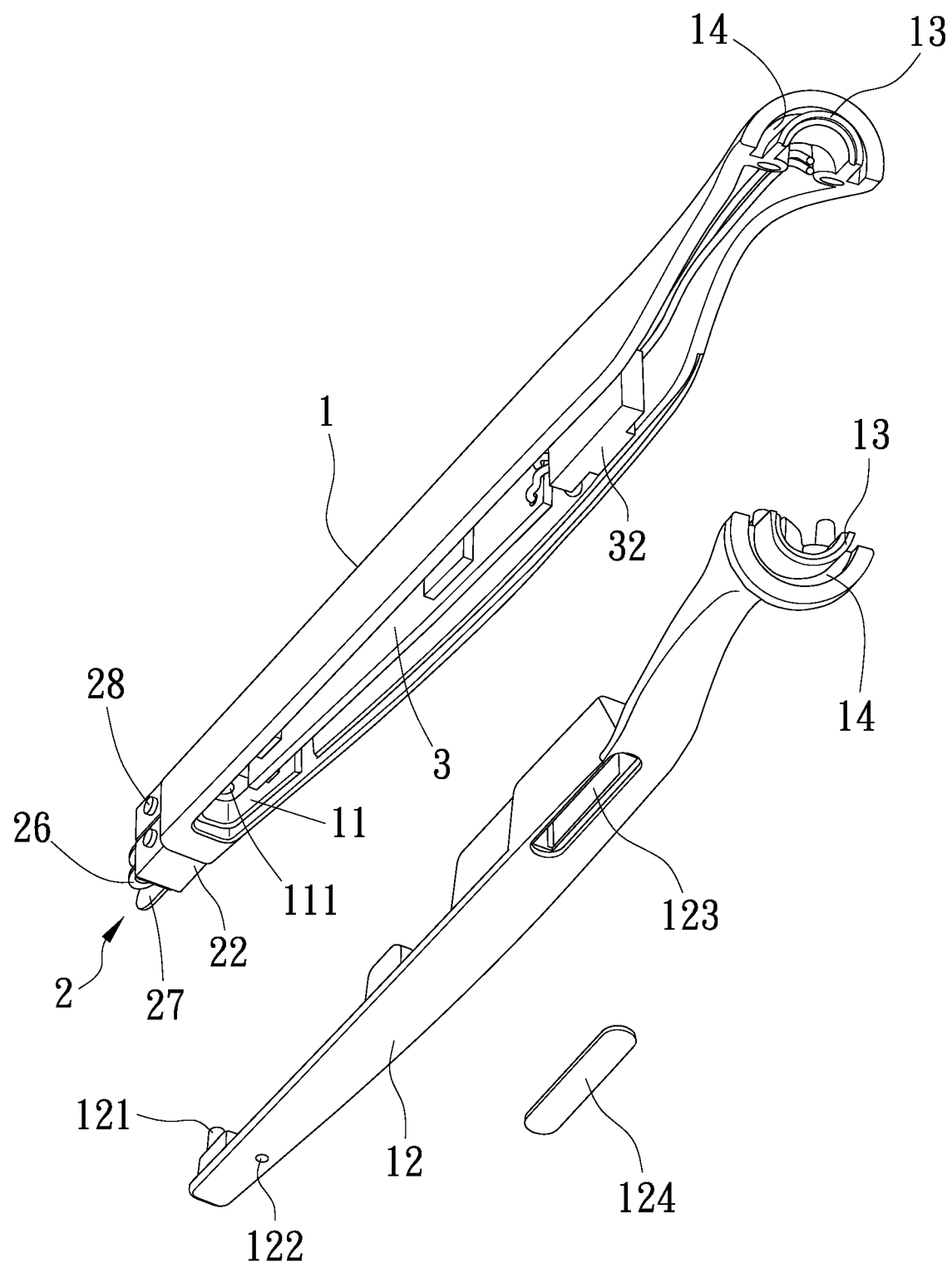
FIG. 2 is a partial explosive view of an embodiment viewed from another angle according to the present invention.

Refer to FIG. 1 and FIG. 2, magnetic Bluetooth eyeglasses according to the present invention mainly includes a temple 1, a hinge 2, a Bluetooth circuit module 3 and a power supply device 4.

Figure 3:
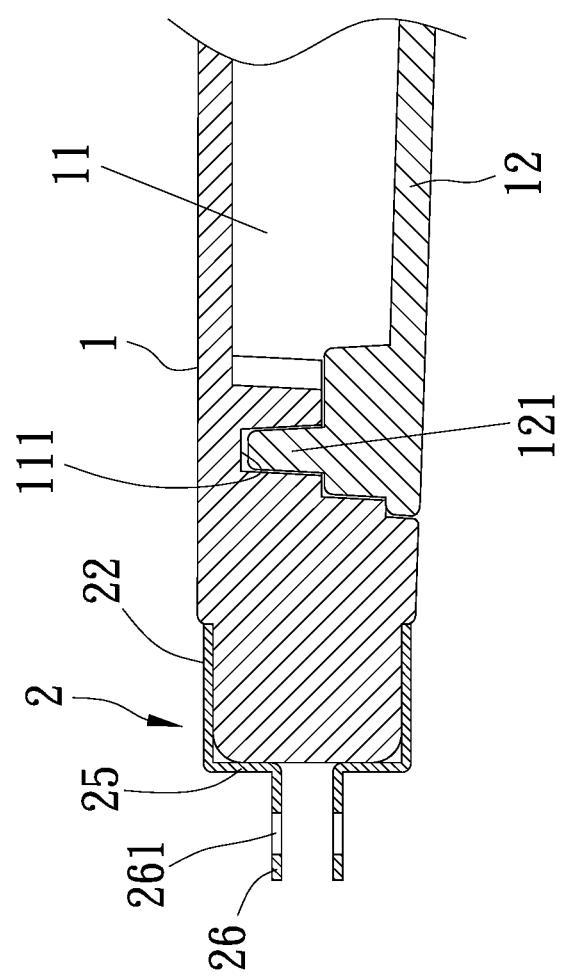
FIG. 3 is a partial sectional view of a temple assembled with a hinge of an embodiment according to the present invention.

The temple 1 consists of a mounting space 11 recessed from a bottom thereof, a cover 12 disposed on the bottom of the temple 1 for covering and connected to the mounting space 11 correspondingly, an assembly portion 13 projecting from a rear end of the temple 1, a mounting groove 14 arranged around a circumference of the assembly portion 13, a first magnetic member 15 mounted and fixed in the mounting groove 14, and a waterproof washer 16 mounted to an outer end of the first magnetic member 15. A plurality of mounting holes 111 are formed in the mounting space 11 while a plurality of pins 121 corresponding to the mounting holes 111 are disposed on the cover 12 and able to be mounted and fixed in the mounting holes 111, as shown in FIG. 3. The cover 12 is further provided with a microphone hole 122, a speaker hole 123, and a speaker cover 124 arranged over the speaker hole 123. The microphone hole 122 and the speaker hole 123 penetrate the cover 12 and communicate with the mounting space 11.

Figure 4:
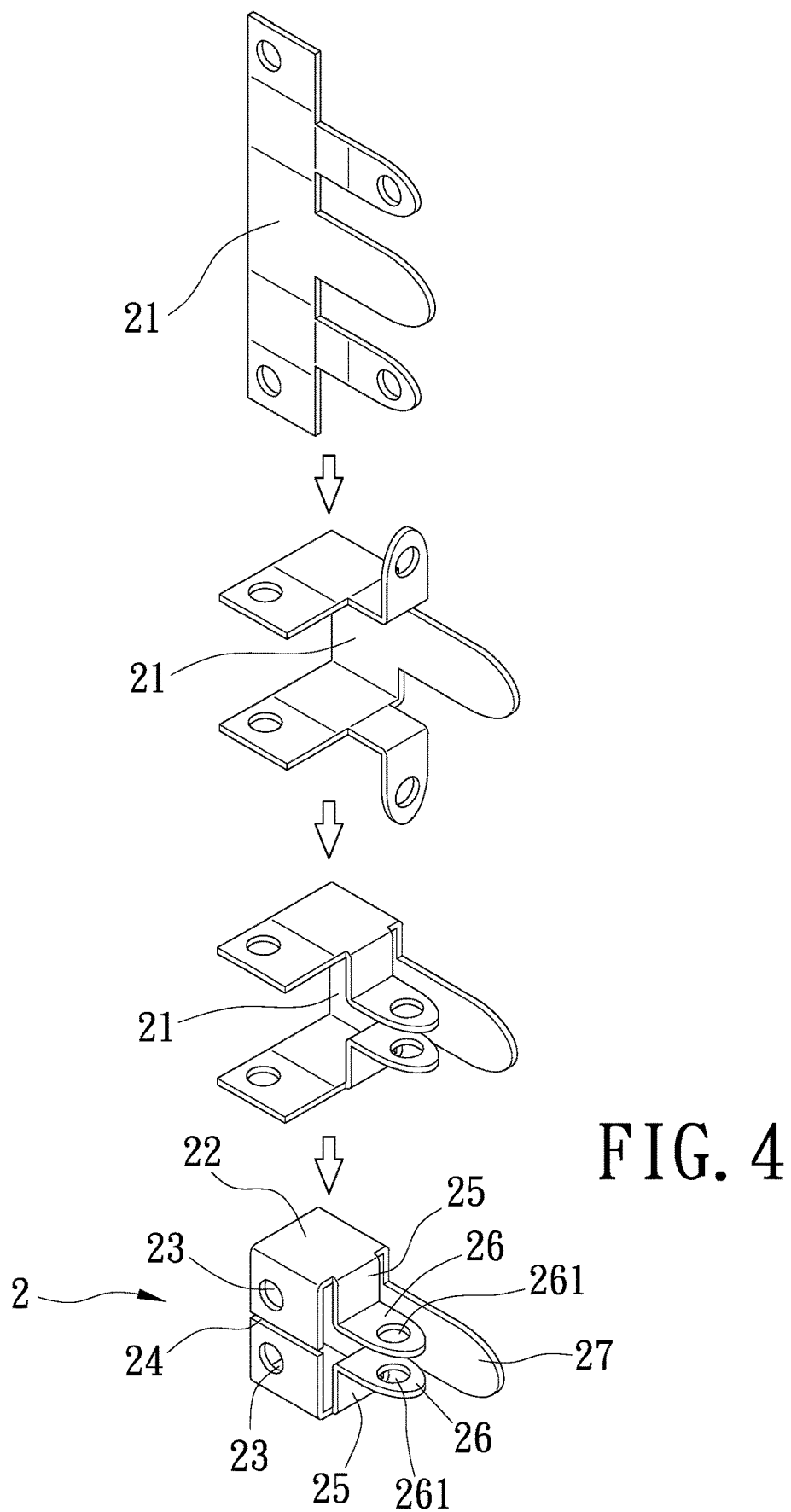
FIG. 4 is a schematic drawing showing formation of a hinge of an embodiment according to the present invention.

Refer to FIG. 4, the hinge 2 is formed by a metal plate 21 bent integrally and is composed of a mounting portion 22, a locking hole 23 penetrating a wall surface of one side of the mounting portion 22, a groove 24 formed on a wall surface of one side of the mounting portion 22 for providing elasticity to an inner space of the mounting portion 22, two stopping pieces 25 formed on one end of the mounting portion 22, two pivot pieces 26 extending vertically from the mounting portion 22, and an elastic piece 27 extending from the mounting portion 22 along the direction the same as the pivot piece 26. The two stopping pieces 25 are corresponding to each other and covering one end of the mounting portion 22 while each of the pivot pieces 26 is provided with a pivot hole 261 and the two pivot holes 261 are aligned with each other. The hinge 2 is connected and fixed to a front end of the temple 1 by the mounting portion 22 while the front end of the temple 1 is limited by the stopping pieces 25. The hinge 2 is fastened and fixed to the temple 1 by a fastener 28 inserted through the locking hole 23.

The Bluetooth circuit module 3 is mounted in the mounting space 11 of the temple 1. A Bluetooth unit is built in the Bluetooth circuit module 3 so that the Bluetooth circuit module 3 can be connected to users' mobile devices by the built-in Bluetooth unit. The Bluetooth circuit module 3 is provided with a microphone 31 which corresponds to the microphone hole 122 and is able to be a noise reduction microphone, and a speaker 32 which corresponds to the speaker hole 123 and is able to be a speaker with an acoustic chamber. The Bluetooth circuit module 3 further includes a touch switch 33 allowing users to operate with just a touch, and a power connection base 34 that is arranged at the rear end of the temple 1 and provided with an electrode portion 341.

Figure 5:
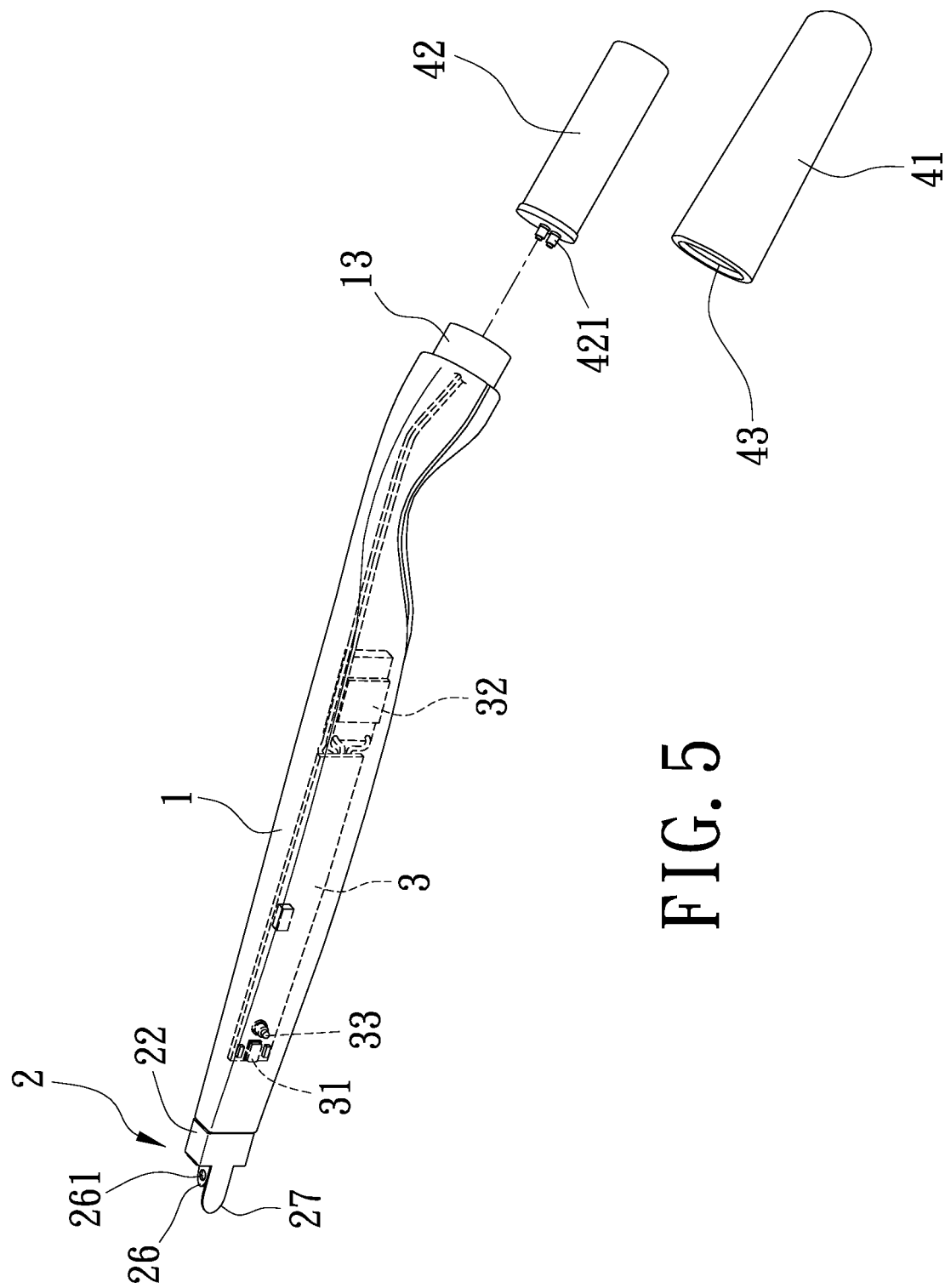
FIG. 5 is an explosive view of a power supply device of an embodiment according to the present invention.
Figure 6:
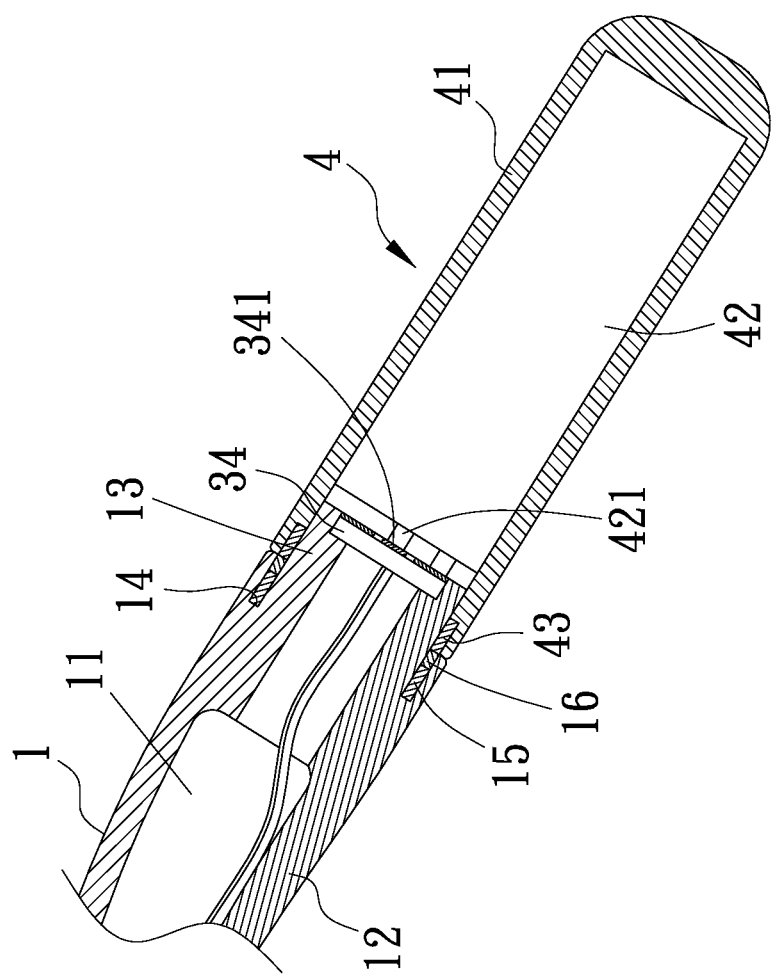
FIG. 6 is a partial sectional view of a power supply device assembled with a temple of an embodiment according to the present invention.

Refer to FIG. 5 and FIG. 6, the power supply device 4 consists of a receiving case 41 fitted on and connected to the mounting groove 14 at the rear end of the temple 1, an electricity storage unit 42 mounted in the receiving case 41, and a second magnetic member 43 arranged at an inner circumference of the receiving case 41 and able to connect to the first magnetic member 15 mounted in the mounting groove 14 of the temple 1 by magnetic attraction. The electricity storage unit 42 is able to be a storage battery, a charging capacitor, etc. and provided with power terminals 421 which correspond to and are in contact with the electrode portion 341 of the power connection base 34 of the Bluetooth circuit module 3.

Thereby the Bluetooth circuit module 3 is mounted in the mounting space 11 of the temple 1 and the cover 12 is aligned with and connected to the mounting space 11 by the pins 121 mounted and fixed in the mounting holes 111. Then the receiving case 41 of the power supply device 4 is fitted on and connected to the mounting groove 14 so that the second magnetic member 43 mounted in the inner end of the receiving case 41 is connected to the first magnetic member 15 mounted in the mounting groove 14 by magnetic attraction. The waterproof washer 16 is arranged between the first magnetic member 15 and the second magnetic member 43 to prevent moisture from infiltrating into the device. At the moment, the power terminals 421 of the storage unit 42 are in contact with the electrode portion 341 of the power connection base 34 for supplying power.

While in use, a user's mobile device is connected to the Bluetooth unit built in the Bluetooth circuit module 3 so that the user can perform touch operations by the touch switch 33 of the Bluetooth circuit module 3 in the temple 1 in order to listen music played by the speaker 32 and broadcasted through the speaker cover 124 over the speaker hole 123, or talk to others by the microphone 31 in combination with the speaker 32. Thereby the user can use the mobile device more conveniently.

Figure 7:
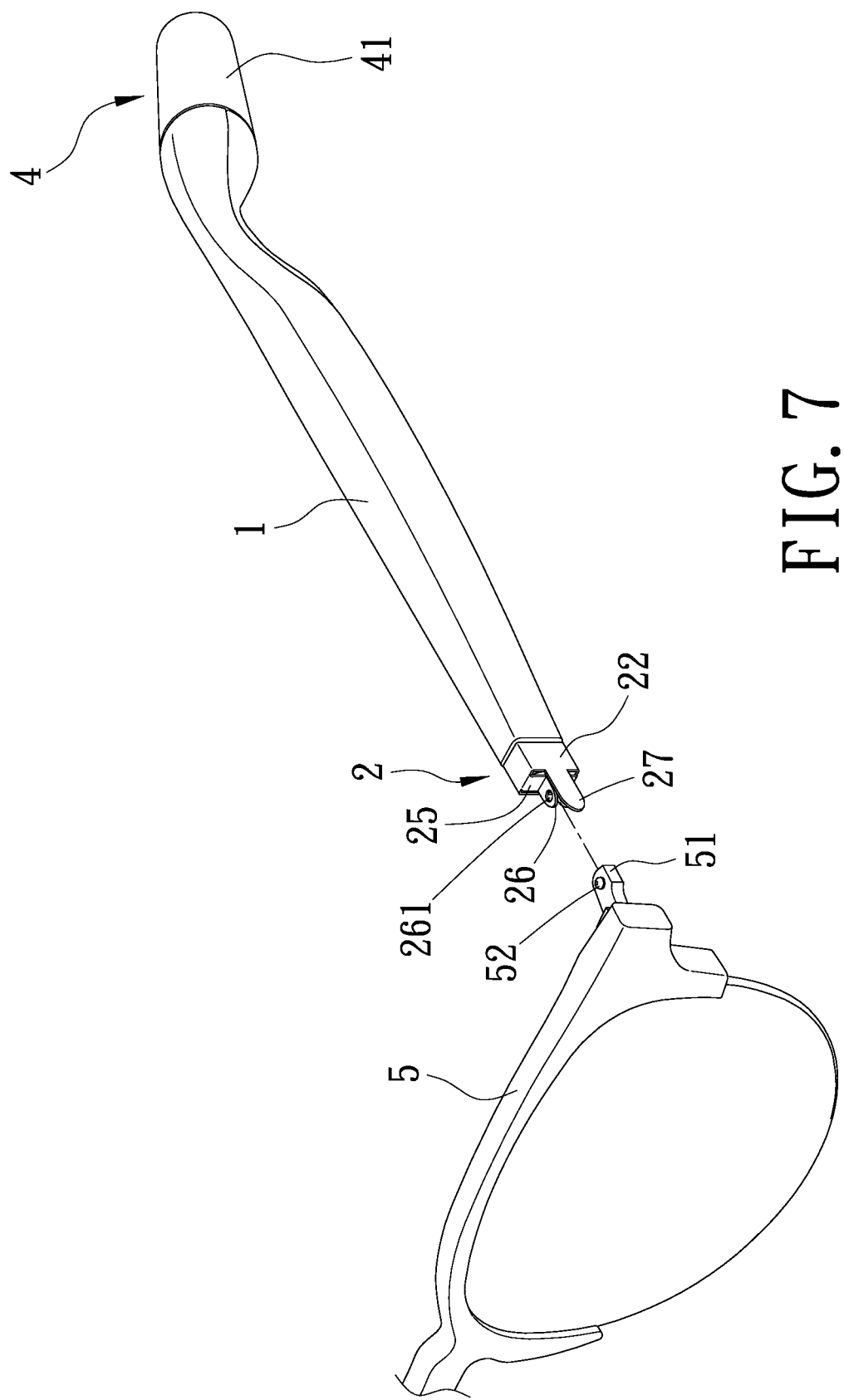
FIG. 7 is an explosive view of a hinge assembled with a frame of an embodiment according to the present invention.
Figure 8:
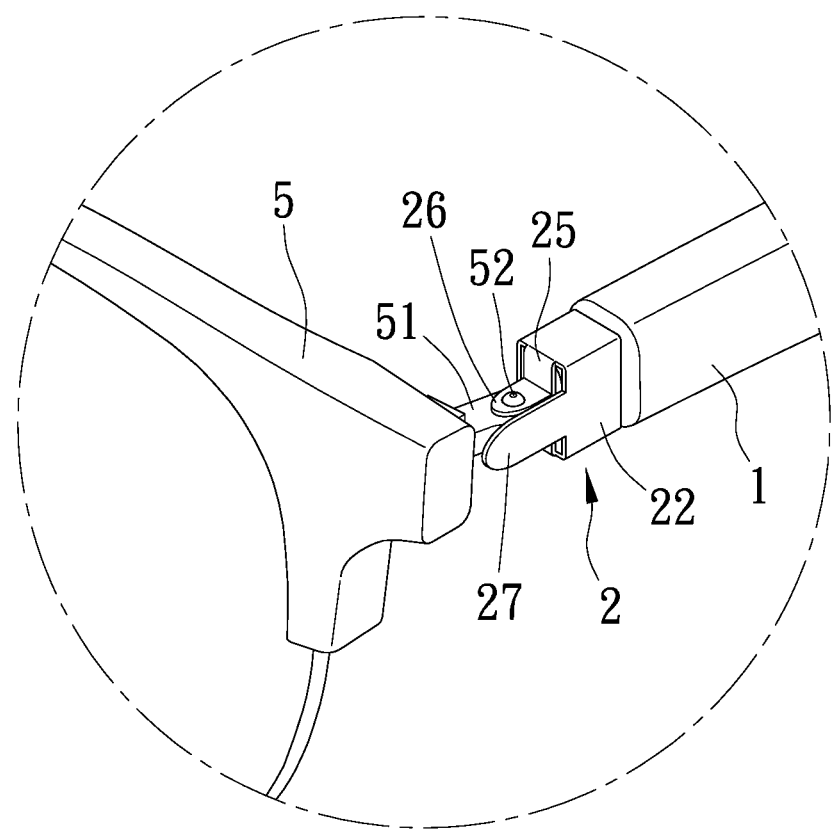
FIG. 8 is a partially enlarged perspective view of a hinge assembled with a frame of an embodiment according to the present invention.
Figure 9:
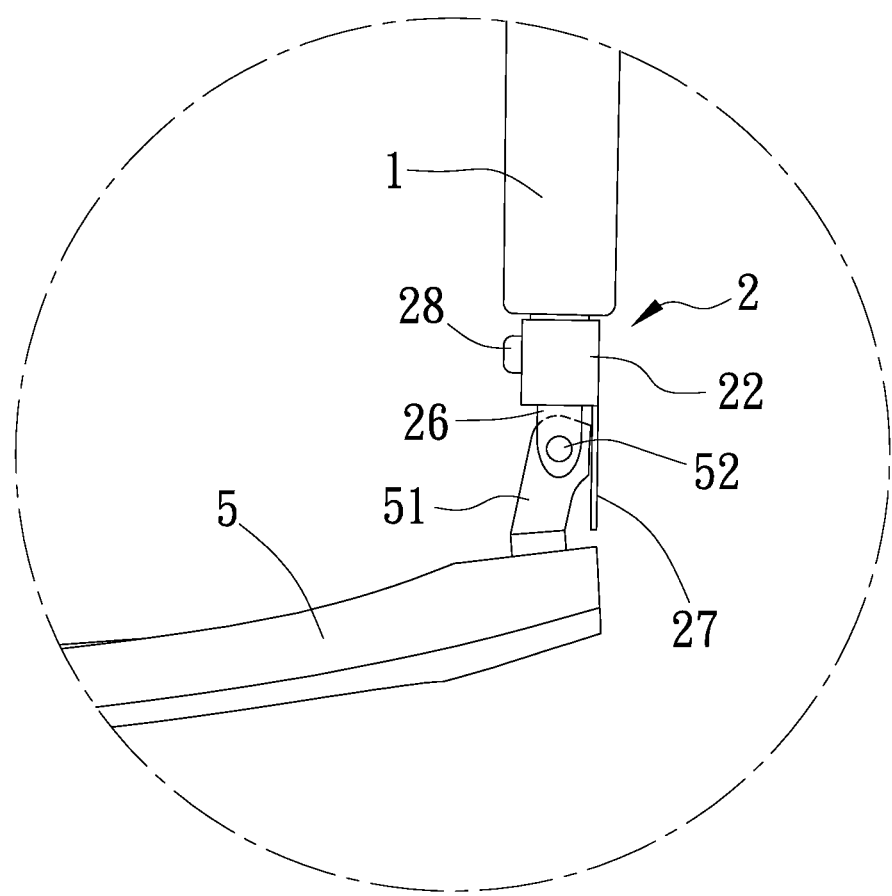
FIG. 9 is a partially enlarged top view of a hinge assembled with a frame of an embodiment according to the present invention.
Figure 10:
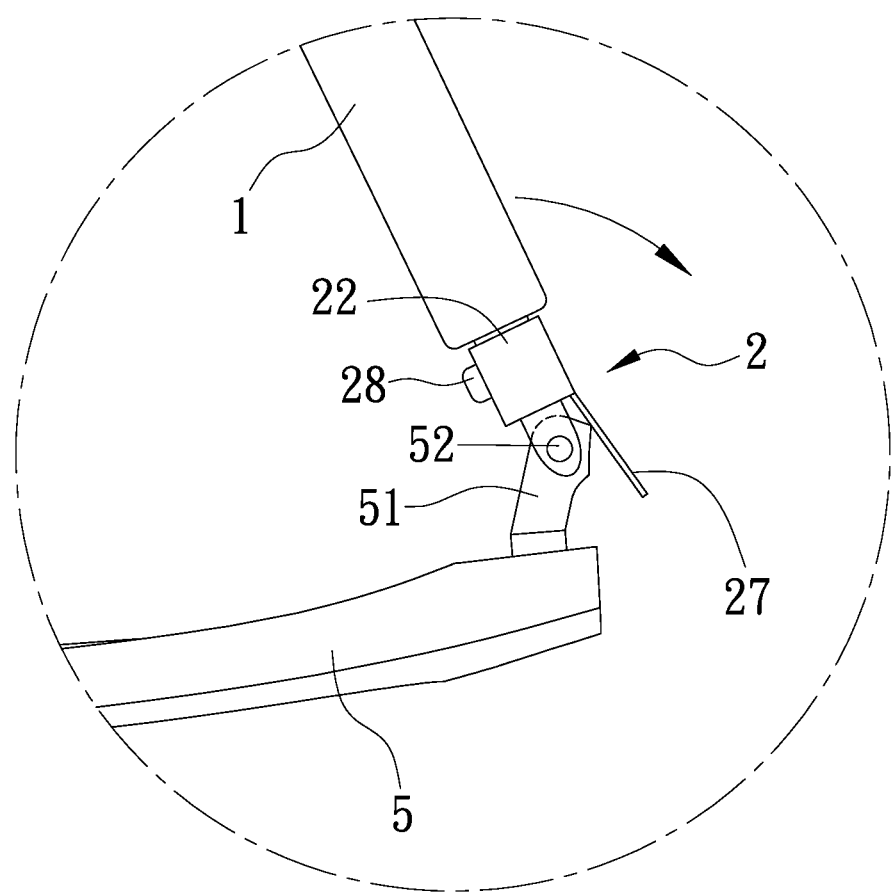
FIG. 10 is a partially enlarged top view of a temple of an embodiment being open according to the present invention.
Figure 11:
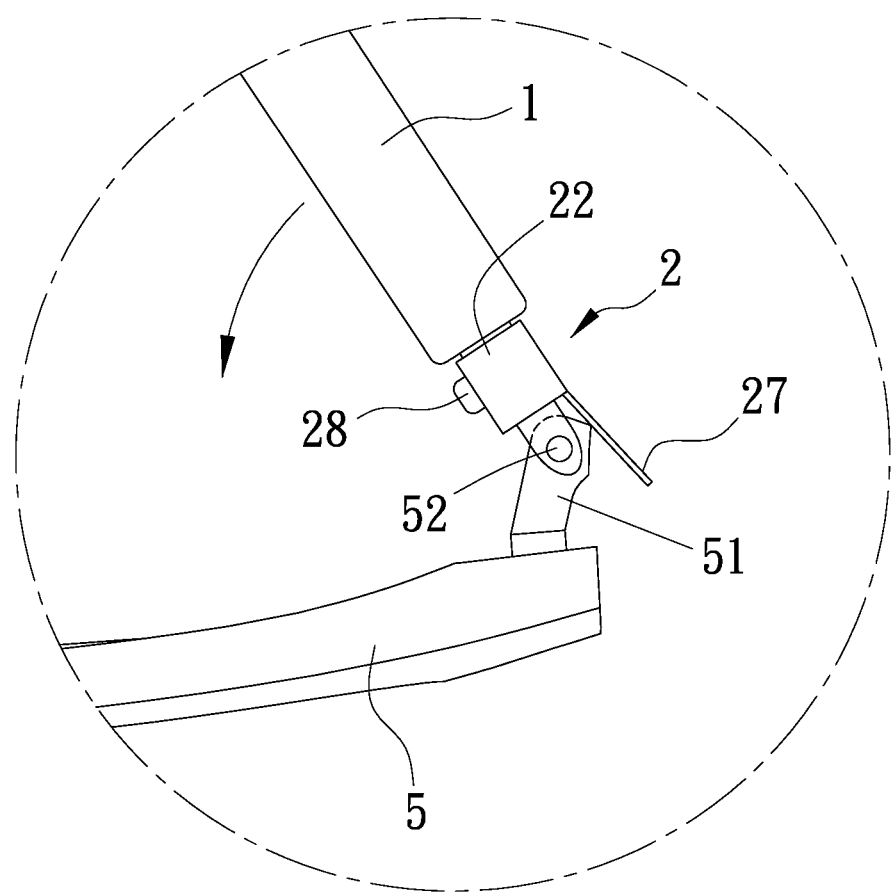
FIG. 11 is a partially enlarged top view of a temple of an embodiment being folded according to the present invention.

Refer to FIG. 7, FIG. 8 and FIG. 9, after the hinge 2 being connected to the temple 1 by the mounting portion 22 connected and fixed to the front end of the temple 1 by, the hinge 2 is connected to a frame 5 by the pivot holes 261 of the pivot pieces 26 being pivotally connected to or directly fastened with a pivot shaft 52 of an assembly part 51 on each of two sides of the frame 5. Now the elastic piece 27 is abutting against an outer side of the assembly part 51. When users intend to wear eyeglasses and open the temples 1, the temples 1 are automatically opened and positioned once being opened to a certain angle due to the elastic piece 27 which abuts against the assembly part 51 of the frame 5 elastically, as shown in FIG. 10. While the user wears the eyeglasses, the width between the two open temples 1 can be changed by the elasticity of the elastic pieces 27 according to the width of user's face. Thus the two temples 1 elastically lean against two sides of the user's head and the user wears the eyeglasses securely, without being pressed tightly by the temples 1. When the user wants to close the temples 1, the temples 1 are also automatically closed and positioned once being closed to a certain angle due to the elastic piece 27, as shown in FIG. 11.

In summary, the present invention has the following advantages compared with the device available now.

1. The electricity storage unit used in the present invention can be a charging capacitor so that the charging process is much faster and the eyeglasses are safer to use.

2. Instead of the conventional assembly of the hinge with screws, the present invention uses the hinge in combination with the frame to prevent loosening of the temple after being used for a period of time. Moreover, the design allows users to assemble and disassembled the assembly of the hinge with the frame by themselves conveniently. Thus the assembly, replacement and maintenance of the frame and the temples of the eyeglasses become much easier.

3. By elasticity of the elastic piece of the hinge, the temple can be automatically open and closed once being rotated to a certain angle. The eyeglasses are more convenient to use. The width between the two open temples can be modified according to the width of user's face and the two temples are elastically leaning against the user's head. Thereby the user wears the eyeglasses comfortably and securely without feeling tightly pressed at the area around the temple.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. Magnetic Bluetooth eyeglasses comprising a temple, a Bluetooth circuit module, and a power supply device;
    wherein the temple includes a recessed mounting space with a plurality of mounting holes, a cover disposed corresponding to the mounting space for covering and connected to the mounting space, an assembly portion projecting from a rear end of the temple, a mounting groove arranged around a circumference of the assembly portion, and a first magnetic member mounted and fixed in the mounting groove, a waterproof washer mounted to an outer end of the first magnetic member of the temple; wherein a plurality of pins corresponding to the mounting holes are disposed on the cover and able to be mounted and fixed in the mounting holes; wherein the temple further provided with a microphone hole and a speaker hole, both penetrating a bottom of the temple and communicating with the mounting space;
    wherein the Bluetooth circuit module is mounted in the mounting space of the temple and having a built-in Bluetooth unit for connection to users' mobile devices; the Bluetooth circuit module is provided with a microphone corresponding to the microphone hole, a speaker corresponding to the speaker hole, a touch switch allowing users to operate with a touch, and a power connection base disposed at the rear end of the temple and provided with an electrode portion; and
    wherein the power supply device includes a receiving case fitted on and connected to the mounting groove at the rear end of the temple, an electricity storage unit mounted in the receiving case and provided with power terminals in contact with the electrode portion of the power connection base of the Bluetooth circuit module, and a second magnetic member disposed on an inner circumference of the receiving case and able to connect to the first magnetic member mounted in the mounting groove of the temple by magnetic attraction.

2. The device as claimed as in claim 1, wherein the mounting space is recessed from the bottom of the temple while the microphone hole and the speaker hole penetrate the cover and communicate with the mounting space.

3. The device as claimed as in claim 1, wherein a speaker cover is arranged over the speaker hole of the temple.

4. The device as claimed as in claim 1, wherein the microphone of the Bluetooth circuit module is a noise reduction microphone.

5. The device as claimed as in claim 1, wherein the speaker of the Bluetooth circuit module is a speaker with an acoustic chamber.

6. The device as claimed as in claim 1, wherein the electricity storage unit of the power supply device is selected from the group consisting of a storage battery and a charging capacitor.

7. The device as claimed as in claim 1, wherein a hinge is connected and fixed to a front end of the temple; wherein the hinge is provided with a mounting portion, a groove formed on a wall surface of one side of the mounting portion for providing elasticity to an inner space of the mounting portion, two stopping pieces formed on one end of the mounting portion and corresponding to each other, two pivot pieces each of which is extending vertically from the mounting portion and provided with a pivot hole while the two pivot holes are aligned with each other, and an elastic piece extending from the mounting portion along the direction the same as the pivot piece; wherein the hinge is connected and fixed to the front end of the temple by the mounting portion and the front end of the temple is limited by the stopping pieces; the hinge is connected to a frame by the pivot holes of the pivot pieces being pivotally connected to a pivot shaft of an assembly part on each of two sides of the frame while the elastic piece is abutting against an outer side of the assembly part.

8. The device as claimed as in claim 7, wherein the hinge is formed by a metal plate bent integrally.

9. The device as claimed as in claim 7, wherein a locking hole penetrates a wall surface of one side of the mounting portion of the hinge so that the hinge is fastened and fixed to the temple by a fastener inserted through the locking hole.

10. Magnetic Bluetooth eyeglasses comprising a temple, a Bluetooth circuit module, and a power supply device;
   wherein the temple includes a recessed mounting space with a plurality of mounting holes, a cover disposed corresponding to the mounting space for covering and connected to the mounting space, an assembly portion projecting from a rear end of the temple, a mounting groove arranged around a circumference of the assembly portion, and a first magnetic member mounted and fixed in the mounting groove; wherein a plurality of pins corresponding to the mounting holes are disposed on the cover and able to be mounted and fixed in the mounting holes; wherein the temple further provided with a microphone hole and a speaker hole, both penetrating a bottom of the temple and communicating with the mounting space;
   wherein a hinge is connected and fixed to a front end of the temple; wherein the hinge is provided with a mounting portion, a groove formed on a wall surface of one side of the mounting portion for providing elasticity to an inner space of the mounting portion, two stopping pieces formed on one end of the mounting portion and corresponding to each other, two pivot pieces each of which is extending vertically from the mounting portion and provided with a pivot hole while the two pivot holes are aligned with each other, and an elastic piece extending from the mounting portion along the direction the same as the pivot piece; wherein the hinge is connected and fixed to the front end of the temple by the mounting portion and the front end of the temple is limited by the stopping pieces; the hinge is connected to a frame by the pivot holes of the pivot pieces being pivotally connected to a pivot shaft of an assembly part on each of two sides of the frame while the elastic piece is abutting against an outer side of the assembly part;
   wherein the Bluetooth circuit module is mounted in the mounting space of the temple and having a built-in Bluetooth unit for connection to users' mobile devices; the Bluetooth circuit module is provided with a microphone corresponding to the microphone hole, a speaker corresponding to the speaker hole, a touch switch allowing users to operate with a touch, and a power connection base disposed at the rear end of the temple and provided with an electrode portion; and
   wherein the power supply device includes a receiving case fitted on and connected to the mounting groove at the rear end of the temple, an electricity storage unit mounted in the receiving case and provided with power terminals in contact with the electrode portion of the power connection base of the Bluetooth circuit module, and a second magnetic member disposed on an inner circumference of the receiving case and able to connect to the first magnetic member mounted in the mounting groove of the temple by magnetic attraction.

* * * * *